United States Patent [19]

Marliave

[11] 4,259,926
[45] Apr. 7, 1981

[54] METHOD AND APPARATUS FOR REARING OF PLANKTONIC LARVAE OF MARINE ANIMALS

[76] Inventor: Jeffrey B. Marliave, 2423 King Ave., West Vancouver, B. C., Canada, V7V 2C5

[21] Appl. No.: 112,841

[22] Filed: Jan. 17, 1980

Related U.S. Application Data

[63] Continuation-in-part of Ser. No. 14,168, Feb. 22, 1979, abandoned.

[51] Int. Cl.³ ............................................. A01K 61/00
[52] U.S. Cl. ........................................... 119/2; 119/3; 47/1.4
[58] Field of Search ...................... 119/2, 3, 4; 43/6.5, 43/7, 100; 47/1.4

[56] References Cited

U.S. PATENT DOCUMENTS

| | | | |
|---|---|---|---|
| 3,653,358 | 4/1972 | Fremont | 119/3 |
| 4,084,543 | 4/1978 | Pequegnat | 119/3 |
| 4,164,199 | 8/1979 | Pequegnat | 119/2 |

OTHER PUBLICATIONS

The Trichterkreisel, An Insitu Device for Cultivating Marine Animals in Tidal Currents, P. Jatzke, 1970, Helgolander, Wiss., Meeresunters, 20,685.
The "Planktonkreisel", A New Device for Culturing Zooplankton, W. Greve, 1968, 1, Marine Biology, 201.
A Fish-Rearing System Incorporating Cages, Water Circulation, and Sewage Removal, Lewis et al., The Progressive Fish-Culturist, vol. 38, No. 2, Apr. 1976, p. 78
A Self-Cleaning Floating Fish Tank, Hunter et al. The Progressive Fish-Culturist, vol. 37, No. 2, Apr. 1975, p. 115.

Primary Examiner—Hugh R. Chamblee
Attorney, Agent, or Firm—Klarquist, Sparkman, Campbell, Leigh, Hall & Whinston

[57] ABSTRACT

A method and apparatus for the field rearing of planktonic larvae of marine animals involving suspending a field culture enclosure in oceanic tidal waters, stocking the enclosure with larvae of a preselected species of marine animal, permitting the enclosure to orient in response to the tidal flow of water, screening out larger plankton from entry into the enclosure and filtering water leaving the enclosure to impede the escape of the larvae and food plankton. The culture enclosure is suspended from floatation means and is equipped with a drop-rudder supported horizontally outwardly and spaced form the enclosure side The entry port has a plurality of deflection vanes to direct incoming water towards the enclosure periphery so that a substantially circular flow of water within the enclosure is achieved. By withdrawing water from the enclosure bottom a down-welling combines with the circular flow to cause food plankton and larvae to accumulate near the center and top of the enclosure. A filter bed over the enclosure bottom impedes the escape of larvae and food plankton while permitting moribund larvae and plankton, excretions and waste material to penetrate the bed and undergo bio-degradation thereby preventing the formation of an infectious bacterial scum on the enclosure bottom.

24 Claims, 3 Drawing Figures

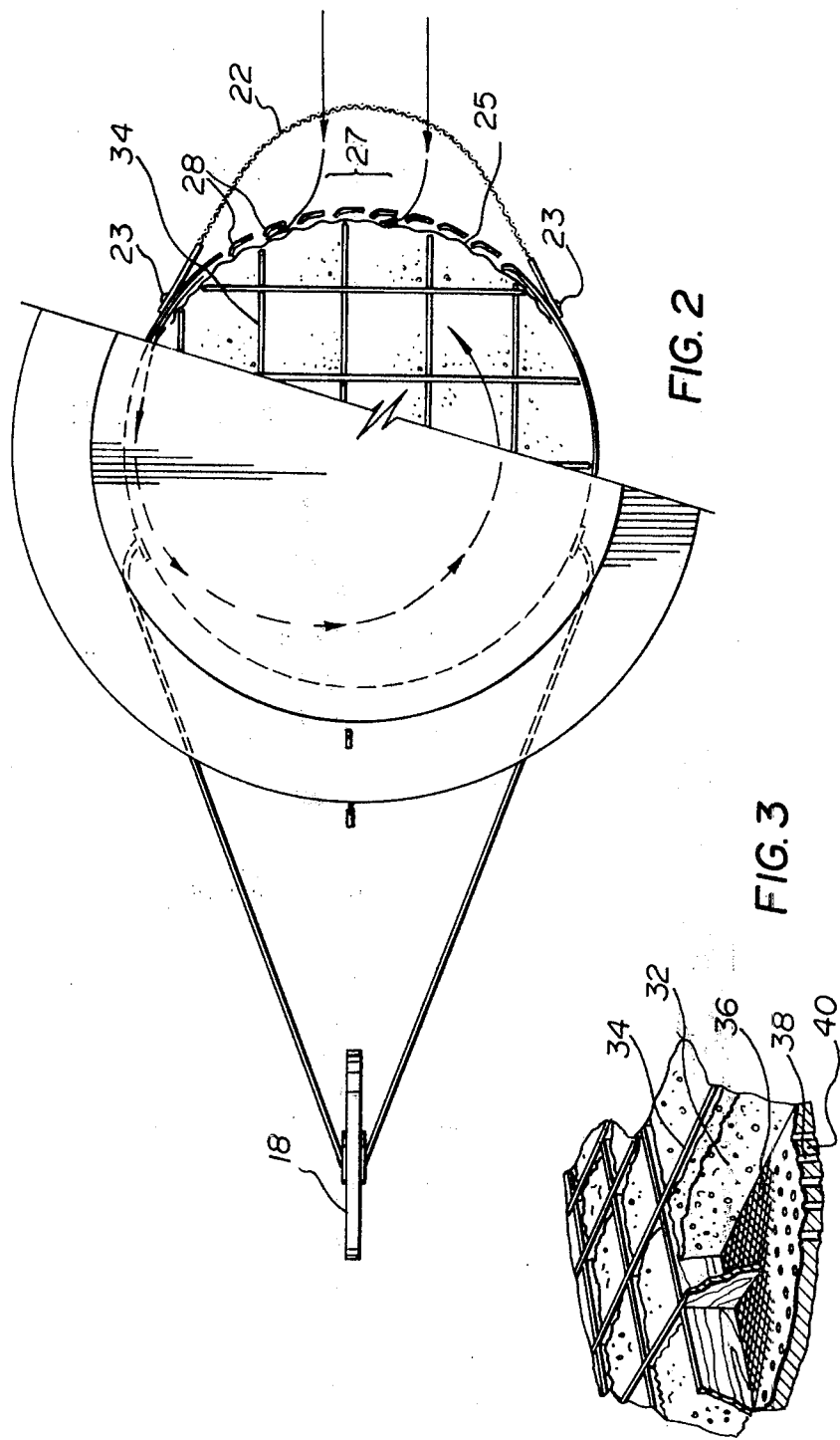

METHOD AND APPARATUS FOR REARING OF PLANKTONIC LARVAE OF MARINE ANIMALS

BACKGROUND OF THE INVENTION

The present invention relates to a method and apparatus for the field rearing of planktonic larval forms of marine animals. This method and apparatus has particular application to fish and decapod crustaceans.

Over the past century, considerable effort has been expanded in attempts to rear marine larvae in the laboratory, but such methods have had very little success in rearing such larvae past the metamorphosis stage. The greatest difficulties with laboratory rearing have been in the collection and maintenance of wild plankton, or the laboratory culture of microplankton, used as food, and in maintenance of proper sanitation conditions within culture chambers. Such laboratory methods, moreover, have required unacceptably large amounts of time and labour making them impracticable for commercial use. Other problems in laboratory rearing of larvae include the difficulty in establishing proper lighting conditions, destruction of food plankton by pump impellors used to circulate unfiltered seawater systems and establishment of a proper seawater flow pattern to maintain the plankton in proximity to the larvae.

As a consequence of the aforementioned difficulties in the laboratory rearing of marine larvae, some attempts have been made to develop field rearing methods. Geoffrey Lawrence, at the 1978 Conference of the American Society of Limnology and Oceanography held in Victoria, British Columbia, Canada, described a screened cylindrical chamber employed in oceanic tidal water, whereby the water was allowed to simply flow straight through the chamber which contained flat fish larvae. No feature was present in the latter method to accumulate food plankton or to maintain the food plankton in close proximity to the larvae. The latter method also failed to provide a self-operating mechanism for withdrawing waste material from the tank. Consequently, the Lawrence method was limited to rearing relatively small concentrations of larvae in numbers insufficient for a commercial operation.

SUMMARY OF THE INVENTION

According to the present invention, there is provided a method and apparatus for the field rearing of planktonic larval forms of marine animals involving the suspension of a field culture chamber in oceanic tidal waters. The chamber itself is provided with an entry port in its side to adjustably admit tidal flow water, a means for deflecting water around the chamber periphery, and an exit port in the chamber bottom to permit the outflow of water from the chamber. A curtain is suspended over the interior openings of the entry vanes to prevent the exit of larvae through the entry port. The interior of the chamber is stocked with larvae of a preselected species of marine animal. The chamber is oriented in response to the tidal flow of water so that the water flows into the chamber through its entry port. Prior to entering the chamber, the water is screened to prevent admittance of plankton of greater than a predetermined size, and to permit admittance of plankton small enough to be utilized as food by the larvae of the preselected species. Water flowing out of the chamber through the exit port is filtered to prevent the escape of larvae and food plankton.

Advantageously, the flow of water into the chamber may be adjusted on the basis of lunar tidal flow cycles to establish an optimum average tidal flow therein. Preferably, moribund larvae, excretions and waste material are withdrawn from the interior of the chamber to prevent formation of a bacterial scum on the bottom surface thereof. One means of withdrawal of such material is by utilization of a filter bed on the bottom of the chamber covering the exit port. Such a bed serves not only to impede the escape from the chamber of larvae and food plankton, but also to allow the moribund larvae, excretion and waste material to penetrate into the interior of the filter bed and to undergo bio-degradation, thereby avoiding the development of a bacterial scum on the surface. Since it has been observed that larvae which sink are more likely than not to swim near the bottom of the chamber, bacterial scum present on the uppermost surface of the bottom can infect and thereby kill such larvae.

By deflecting incoming water around the chamber periphery and permitting its outflow from the exit port at the bottom, a substantially circular flow of water is set up in the chamber, with a central down-welling. In such a current, food plankton tend to accumulate at the centre of the water surface in the chamber where minimum flow velocities exist, and the larvae locate in and around this food plankton. Optimally, the interior walls of the chamber are a dark colour in order that the larvae are not phototactically attracted to the chamber periphery. The method of establishing current flow in the chamber and the darkened walls of the chamber interior thus avoid or reduce potentially damaging contact by the larvae with the periphery of the container.

Screening of the water entering the tank prevents entry of predators and large plankton which can damage or kill the preselected larvae and food plankton, while permitting continuous entry of food plankton.

The afore said filter bed is composed of filtration medium that is of a specific gravity somewhat greater than that of seawater but is generally light in weight. The chamber must be ballasted so that in combination with flotation means attached to the top of the chamber, it maintains a stable upright position. By selecting the chamber in the form of a cylinder, and the flotation means in the form of a buoyant collar surrounding the chamber near its top, the chamber can rotate within the collar.

The weight of the rudder and struts must be buoyed or counter-ballasted to prevent binding in the vertically oriented flotation collar, that is, the chamber must be balanced in its ballasting, with total buoyancy only slightly negative, to lessen friction with the flotation collar. The collar can be fixed to a floating pier or by a plurality of anchor lines connected between the collar and anchors resting on the seabed, so that the chamber rotates within the collar. Alternatively, the chamber can simply be connected by a tether line to a fixed object in or over the water and be allowed to swing in order to become oriented properly with respect to the tidal flow of water. The chamber orients in response to the tide, by means of a rudder supported from one side of the chamber opposite the entry port at a distance from the side of the chamber equal to at least its diameter. The chamber assembly is ideally located in a protected inlet of oceanic tidal water, having high plankton densities and a temperature and salinity closely matching that where spawning naturally occurs in the species being reared.

The invention avoids the labour intensive requirements common in laboratory rearing methods by utilizing tidal currents for both the accumulation and retention of food plankton, and for providing a self-operating sanitation mechanism.

Energy costs are also avoided by utilizing tidal currents for creating water flows within the chamber and for proper orientation of the chamber, and also by having available natural oceanic lighting and temperature conditions favourable to larval development.

SUMMARY OF THE DRAWINGS

FIG. 2 is a plan view of the chamber assembly partially in section to show the entry port and deflection vanes.

FIG. 3 illustrates the structure of the porous filter bed and chamber floor.

DETAILED DESCRIPTION WITH REFERENCE TO THE DRAWINGS

Figure 1:
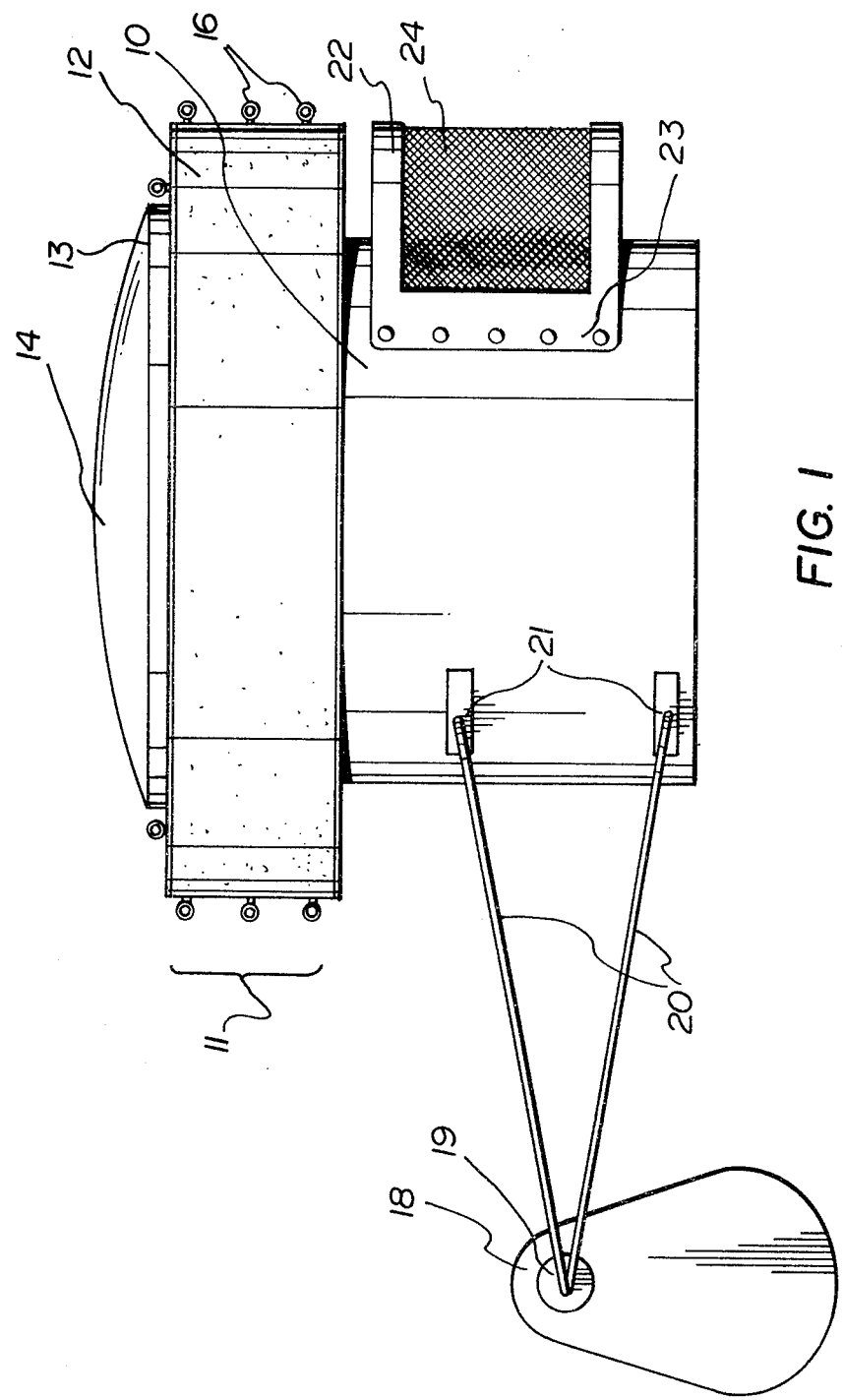
FIG. 1 is an elevation view of the chamber assembly according to the invention.

In the following description, words such as horizontal, vertical, top and bottom are used in a relative rather than absolute sense with reference to the chamber assembly in situ in oceanic tidal waters.

Illustrated in FIG. 1 is a chamber assembly 11, having a cylindrical chamber 10 surrounded near its top, and rotatable within a buoyant collar 12. A flange 13 at the top of the chamber 10 rests on a buoyant collar 12, and a lid 14 covers an opening in the chamber 10 within the flange 13. Affixed to the outer surface of the collar and circumferentially spaced therearound are a plurality of eyelets 16. Below the collar 12, a plurality of support members 20 are each rigidly affixed at one end 21 to the outer surface of the chamber 10, and extend outwardly therefrom to a distal end 19, which pivotally supports a vertically oriented drop-rudder 18. On the side of the chamber 10 opposite the drop-rudder 18 is an arcuate plate 22 affixed at its ends 23 to the exterior surface of the chamber 10 and extending horizontally outwardly therefrom. Attached to the margins of the plate 22, covering an opening formed therein is a screen 24. Adjacent to and horizontally spaced from the screen 24 as illustrated in FIG. 2, is an entry port 27, having spaced thereover a plurality of deflection vanes 28 continuously movable through a limited range from closed positions at which the space between adjacent vanes 28 is a minimum to an open position at which the space between adjacent vanes 28 is a maximum. The vanes 28 which open inwardly are each formed by a three-sided cut in the chamber material itself. The resulting vanes may then be propped open along one side a desired amount by insertion of a nub between the side of the vane and its adjacent edge in the chamber so that each vane is curved inwardly toward a common side of the chamber periphery. A curtain 29 of plastic, or some other suitable material is suspended on the interior side of the vanes 28 to prevent exit of larvae in the chamber.

As illustrated in FIG. 3, the floor 40 of the chamber 10 is perforated with a plurality of small holes 38 which are covered by a mesh 36. A bed of filtration medium 32, for example, plastic or gravel, is located on top of the mesh 36. The filtration medium 32 should be thick enough to allow penetration and bio-degradation of moribund larvae and plankton, excretions and other waste in the interior of the bed.

The filtration medium 32 should be only slightly negative in buoyancy and of coarse grade, permitting debris to pass out of the chamber, yet providing dark spaces into which viable organisms will not usually enter. A plastic ring material available under the trade mark BIO-RING 15, from Norton Co., has been employed successfully as the filtration medium. This material has a high surface area/volume ratio. A thickness of 2 inches has been found to be satisfactory.

The filtration medium 32 is divided by a grid of vertically oriented partitions 34 into a plurality of sections within respective grid elements of the grid of vertically oriented partitions 34. The spacing between individual partitions 34 is selected to prevent shifting of the filtration medium 32 over the bottom of the chamber. A suitable spacing for this purpose has been found to be 10 inches between adjacent partitions. The dimensions of chamber 10 are selected to be large enough so that its surface to volume ratio is low enough to reduce the possibility of larval contact with the peripheral walls of chamber 10 to acceptable levels. Suitable dimensions for the chamber 10 have been found to be a diameter of about 5 feet and a height of about 5 feet.

The method of the invention involves lowering the chamber assembly 11 into suitable tidal flow waters, and suspending it therein by flotation means, such as a floating collar 12, which is secured to a floating pier, or anchors by lines attached to the collar eyelets 16. The chamber 10 is then stocked with larvae of a preselected species of marine animal. To facilitate rotation of chamber 10 within the collar 12, a layer of low friction polyethylene, or the like, may be placed on the interior surface of the collar 12. During tidal flows, the drop-rudder 18 orients the chamber 10 so that water flows into screen 24. Any larger plankton or predators are stopped by the screen 24, leaving smaller plankton to be carried by the current through the inlet port 27, and against the deflection vanes 28. The amount of tidal flow water entering chamber 10 is adjusted depending on the average tidal flow rate over a given lunar tidal flow cycle by the propping open of deflection vanes 28. The incoming water is also deflected by these deflection vanes 28 toward a common side of the chamber 10, thereby establishing a circular flow of water in the interior of the chamber 10. The current gradient thus set up in chamber 10 causes food plankton to accumulate near the centre thereof. By using a light-transmitting lid 14, not only are chops and swells in the water prevented from entering the chamber interior, but the plankton being attracted by the light, tend to stay near the top of the chamber and provide a concentration of larval food in the lower current region within the chamber interior. The interior walls of the chamber are black in colour to reduce their tendency to attract the larvae. Moreover, being encouraged to stay near the centre and top of the chamber 10, the larvae have a reduced probability of having their feeding disrupted by contact with the chamber periphery.

Other obvious variations, modifications and departures from the specific method and apparatus described above, will readily occur to those skilled in the art, but are intended to form part of the overall invention. The scope of the present invention is set forth in the accompanying claims.

I claim:

1. A method for the field rearing of planktonic larval forms of marine animals comprising:

(a) suspending a field culture enclosure in oceanic tidal waters; said enclosure being amenable to the passage therethrough of water;

(b) stocking the interior of said enclosure with planktonic larvae of a preselected species of marine animal;

(c) permitting said enclosure to orient in response to tidal flow of said oceanic tidal waters to admit water into said enclosure;

(d) screening said tidal flow of water prior to entry into said enclosure thereby preventing the entry into said enclosure of plankton of greater than a predetermined size, and permitting the entry into said enclosure of food plankton of less than a predetermined size; and (e) filtering said water prior to its exiting said enclosure to prevent the escape of the larvae and food plankton therefrom.

2. A method as defined in claim 1, further comprising withdrawing from the interior surface of said enclosure moribund larvae, excretion and other waste material.

3. A method as defined in claim 2, further comprising adjusting the flow of water into said enclosure on the basis of lunar tidal flow cycles in order to establish an optimum average tidal flow therein.

4. A method as defined in claim 1 wherein a peripheral current is established within the enclosure.

5. A method as defined in claim 4 wherein light enters the enclosure only from above.

6. Apparatus for the field rearing of planktonic larval forms of marine animals comprising:

(a) a field culture enclosure;

(b) means for suspending said enclosure in a body of water;

(c) entry means in the enclosure for admitting tidal flow water therein;

(d) means for deflecting the admitted tidal flow water around the enclosure periphery;

(e) exit means in the enclosure for permitting the outflow of water therefrom;

(f) means for orienting said enclosure in response to the tidal flow of water thereby allowing said entry means to admit water into said enclosure;

(g) means for screening said tidal flow water prior to entry into said enclosure to prevent the entry therein of plankton of greater than a predetermined size and to permit the entry into said enclosure of food plankton of less than a predetermined size; and (h) means for filtering said water prior to its exiting from said enclosure for impeding the escape of fish larvae and food plankton therefrom.

7. Apparatus as defined in claim 6, wherein the diameter and height of said enclosure are each at least about one meter.

8. Apparatus as defined in claim 6, wherein the entry means is located in the side of the enclosure and the exit means is located in the bottom of the enclosure.

9. Apparatus as defined in claim 8, wherein the interior of said enclosure is of a dark colour.

10. Apparatus as defined in claim 9, further comprising means for adjusting the flow of water into said entry means on the basis of lunar tidal flow cycles in order to establish an optimum average tidal flow into the enclosure.

11. Apparatus as defined in claim 8, wherein said screening means is a screen affixed to the exterior of said enclosure, adjacent to and covering said entry means.

12. Apparatus as defined in claim 11, wherein the screen is positioned at a distance from and exteriorly encloses the entry means.

13. Apparatus as defined in claim 11, wherein said entry means is a plurality of openings in said enclosure, said openings being movable from a closed position in which no substantial flow of water may occur through the openings, to open positions through which substantial flows of water may occur, and any such flow is deflected by the openings towards the periphery of the enclosure such that a substantially circular flow of water within the enclosure is developed.

14. Apparatus as defined in claim 13, wherein said openings are constructed to deflect water toward a common side of the periphery.

15. Apparatus as defined in claim 13, wherein the top of said enclosure is open and is covered by a removable light-transmitting lid which prevents the entry into the enclosure of wash caused by chops, swells and man-made wakes.

16. Apparatus as defined in claim 8, wherein said filtering means is a bed of filtration medium covering said exit means.

17. Apparatus as defined in claim 16, wherein said filtration bed rests on a mesh separating the filtration medium from said exit means.

18. Apparatus as defined in claim 17, wherein said exit means is a plurality of holes in the bottom of the enclosure.

19. Apparatus as defined in claim 17, wherein constraining means are provided to prevent the filtration medium from moving over the floor of said enclosure.

20. Apparatus as defined in claim 6, wherein said orienting means is a neutrally buoyant rudder, supported from the side of said enclosure, opposite said entry means, at a distance from the side of said enclosure equal to at least the maximum dimension of said enclosure.

21. Apparatus as defined in claim 20, wherein said enclosure is cylindrical and whose axis when in situ is vertical.

22. Apparatus as defined in claim 21, wherein said suspension means is a buoyant collar surrounding said enclosure near its top and within which said enclosure is rotatable.

23. Apparatus as defined in claim 22, wherein said buoyant collar, when fixed to a floating pier or plurality of anchor lines, is held in a substantially fixed position.

24. Apparatus as defined in claim 22, wherein, when said enclosure and said collar are fixed by a line of a sufficient length to an object fixed relative to the water, said apparatus is free to orient itself in response to tidal flow directions.

* * * * *